May 18, 1926.                           1,584,786
J. J. MACKAY
WHEEL FOR USE ON TRACKS
Filed August 23, 1924

INVENTOR:
JOHN J. MACKAY.
BY Whiteley and Ruckman
ATTORNEYS.

UNITED STATES PATENT OFFICE.

JOHN J. MACKAY, OF MINNEAPOLIS, MINNESOTA.

WHEEL FOR USE ON TRACKS.

Application filed August 23, 1924. Serial No. 733,719.

My invention relates to wheels for use on tracks. An object is to provide a wheel of this character with a rim which is detachably secured in place so that when the rim becomes worn, it may be readily removed and replaced by a new one. While my wheel is intended more particularly for application to street cars and to carriages used in connection with saw mills, it is apparent that it is capable of use in connection with various types of cars with rigid wheels for running on tracks.

The full objects and advantages of my invention will appear in connection with the detailed description, and the novel features of my inventive idea will be particularly pointed out in the claims.

Figure 1:
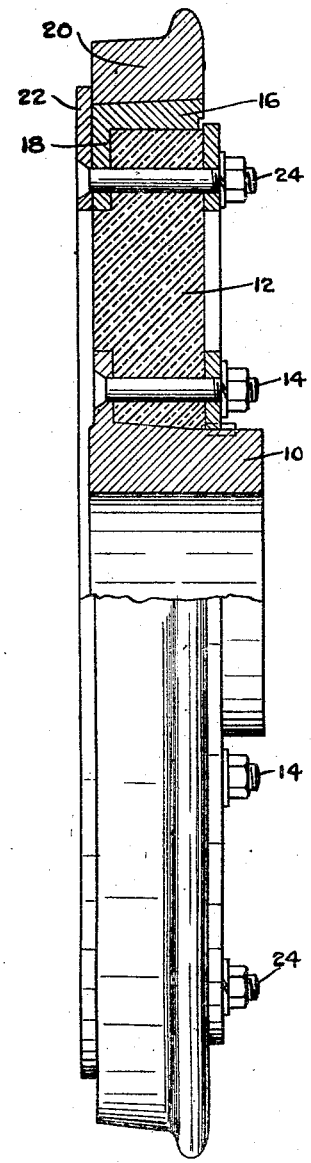
Figure 2:
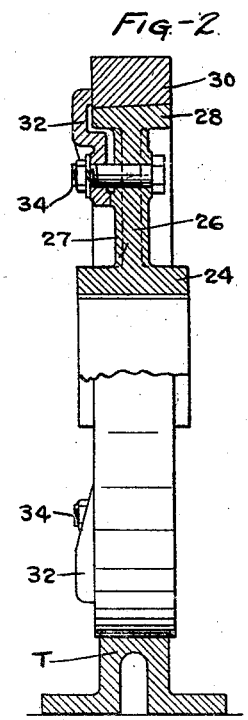
Figure 3:
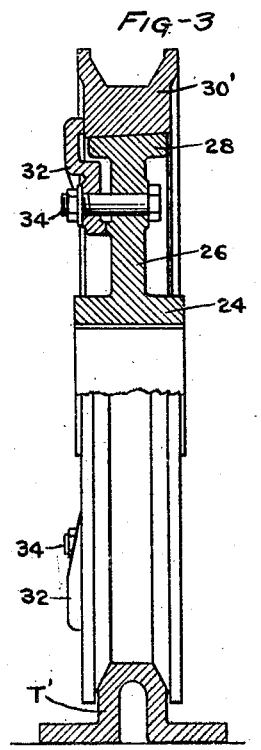
Figure 4:
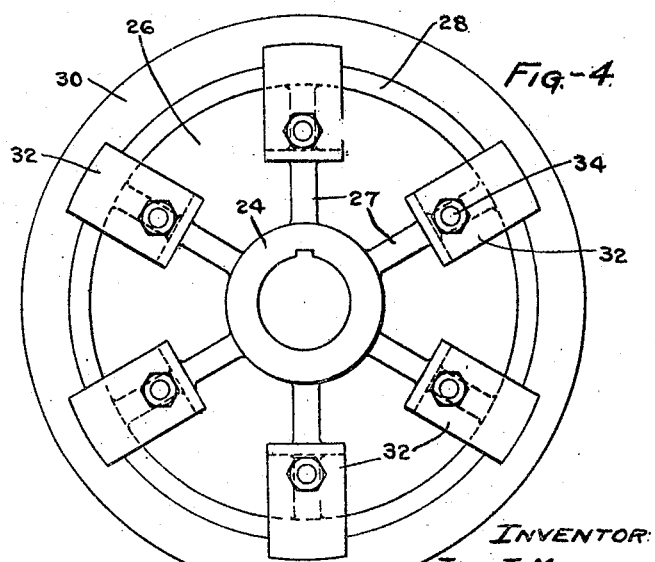

In the accompanying drawings which illustrate different embodiments of the invention, Fig. 1 is a sectional elevational view showing one form of my invention. Fig. 2 is a sectional elevational view showing another form of the invention. Fig. 3 is a sectional elevational view of still another form. Fig. 4 is a face view of the wheel shown in Figs. 2 and 3.

In the form shown in Fig. 1, the main wheel has a tapered hub 10 upon which an annular member 12 of compressed wood is secured by bolts 14. Upon the periphery of the member 12, a metal ring 16 is mounted, this ring having an inwardly extending flange 18. The periphery of the ring 16 is tapered for receiving the tapered inner surface of a flanged rim 20. This rim is held in place by a clamping ring 22 which is secured by bolts 24 passing therethrough and through the flange 18 and member 12. In the form shown in Fig. 2, the main wheel is provided with a hub 24 having an internal annular web 26 having radial spoke-like ribs 27. Upon the periphery of the web a tapered ring 28 is attached, and this ring receives a rim 30 having an inner tapered surface. The rim is held in place by clamps 32 which are secured by bolts 34 passing through the clamps and the web at the places occupied by the ribs 27. The outer surface of the rim 30 is smooth for running upon a track T. The form shown in Fig. 3 is the same as that shown in Fig. 2 except that a grooved rim 30' is provided for running upon a track T'.

The operation and advantages of my invention will be obvious in connection with the foregoing description. When the rim upon any wheel becomes worn to such an extent as to render its continued use objectionable, the portion of the carriage or car supported by such wheel may be jacked-up and the worn rim readily removed, and a new one substituted, thereby dispensing with the necessity of furnishing an entirely new wheel.

I claim:

1. A wheel for use on tracks comprising a wheel body having a web portion and a ring-like portion surrounding said web portion, and extending out therefrom, the outer surface of said ring-like portion being uniformly tapered, a detachable track engaging rim having an inner surface uniformly tapered from one side to the other to fit upon said outer tapered surface, a plurality of clamps spaced around the wheel with their outer ends engaging an outer marginal side wall of said rim and their inner ends engaging said wheel body on the side thereof which is of lesser diameter, and bolts passing through said clamps and through said body portions.

2. A wheel for use on tracks comprising a wheel body having a web portion and a ring-like portion surrounding said web portion and extending out from both sides thereof, the outer surface of said ring-like portion being uniformly tapered, a plurality of spoke-like ribs on said wheel body extending between the hub and said ring-like portion, a detachable track-engaging rim having an inner surface uniformly tapered from one side to the other to fit upon said outer tapered surface, a plurality of clamps spaced around the wheel with their outer ends engaging an outer marginal side wall of said rim and their inner ends engaging said ribs on the side of said wheel body which is of lesser diameter and bolts passing through said clamps and through said body portions.

In testimony whereof I hereunto affix my signature.

JOHN J. MACKAY.